United States Patent [19]

Henry

[11] Patent Number: 5,268,026
[45] Date of Patent: Dec. 7, 1993

[54] POLISH FOR METAL, WOOD, PLASTIC, FIBERGLASS, PAINTED AND SIMILAR SURFACES

[76] Inventor: James M. Henry, 497 Midland Park Dr., Stone Mountain, Ga. 30087

[21] Appl. No.: 970,153

[22] Filed: Nov. 2, 1992

[51] Int. Cl.$^5$ .............................................. C09G 1/02
[52] U.S. Cl. .......................................... 106/8; 106/10; 106/11
[58] Field of Search ........................... 106/8, 10, 11

[56] References Cited

U.S. PATENT DOCUMENTS

| | | | |
|---|---|---|---|
| 2,078,876 | 4/1937 | Hennessey | 106/8 |
| 3,847,622 | 11/1974 | Brandl et al. | 106/10 |
| 4,064,061 | 12/1977 | Henry | 106/8 |

Primary Examiner—Helene Klemanski
Attorney, Agent, or Firm—Harry I. Leon; Vivian L. Steadman

[57] ABSTRACT

A paste-like composition for abrasively cleaning and polishing hard surfaces which comprises silica, stearic acid, mineral seal oil, and petroleum distillate. The composition can be applied with a cleaning cloth, buffing pad or the like which has been impregnated with it. When used to polish metals, wood, plastic, fiberglass, painted surfaces or the like, the composition gives a characteristically brilliant shine.

4 Claims, No Drawings

POLISH FOR METAL, WOOD, PLASTIC, FIBERGLASS, PAINTED AND SIMILAR SURFACES

BACKGROUND OF THE INVENTION

Henry, in U.S. Pat. No. 4,064,061, issued Dec. 20, 1977, discloses a polish composition including mineral oil, aqua ammonia, powdered silica, crystalline stearic acid, and paraffin wax. This combination is an effective polish providing durable protection of the polished surface. However, the paraffin wax contained in this mixture both increases the difficulty of its manufacture and the effort required in polishing. During manufacture, the mixture must be heated in order to get the paraffin wax to form a solution with the remaining components. Unfortunately, this heating also liberates ammonia contained in the polish composition, posing a health hazard to those engaged in preparing it. Moreover, cleanup requires the use of an organic solvent such as an alcohol. The alcohol is employed to cut paraffin wax from any surfaces of equipment which come into contact with the mixture during its manufacture.

SUMMARY OF THE INVENTION

An object of this invention is to provide an improved cleaning and polishing composition for hard surfaces which, when applied to metals, woods, plastics, fiberglass, painted surfaces or the like gives them a high luster finish similar to that provided by the polish composition described in U.S. Pat. No. 4,064,061 but which contains neither ammonia nor paraffin wax.

A further object of this invention is to provide an improved cleaning and polishing composition which can be easily removed with soap and water.

According to the present invention, a cleaning and polishing composition is prepared by liquefying high and low melting point stearic acids and then blending them, without any further heating, with silica, mineral seal oil, petroleum distillate, and preservatives. The composition can be used to impregnate a cleaning cloth, buffing pad or the like by dipping it therein.

In an alternate embodiment, the cleaning and polishing composition is prepared by combining together, again without heating, liquefied high and low melting point stearic acids, silica, and mineral seal oil.

GENERAL DESCRIPTION OF THE INVENTION

In the composition according to the invention, silica is employed as a cleaning agent to remove surface contamination and as an abrasive to literally resurface metal objects. Preferably, the silica has a mesh size of 400, with 100 percent of the silica passing through a 400 mesh. Generally, the percentage by weight of silica in the present composition is within a range of about 30% to about 60%, preferably about 48%. At percentages greater than 60%, upper surfaces of the composition tend, upon prolonged standing, to crack.

The silica content of the composition determines the brilliance of the shine which can be imparted by buffing and polishing a metal object treated with the composition. When suitably applied, polish compositions within the preferred range of silica content yield shines on metal surfaces which vary from a satin finish to a high gloss finish. Compositions with 60% silica by weight yield the most brilliant shines; those with the lowest silica content are used primarily to clean rather than to shine surfaces.

The remainder of the composition is made up of high and low melting point stearic acids, mineral seal oil and petroleum distillate. The polish composition can be formulated with wide variations in the ratios between the concentrations of the stearic acids and of mineral seal oil as well as in the ratios between the concentrations of mineral seal oil and of petroleum distillate and still yield similar performance. The high and low melting point stearic acids, together, constitute from about 10% to about 30% by weight of the composition, with the respective percentages therein of high and low melting point stearic acids being approximately equal and with each of these stearic acids being present in the range of about 5 percent to about 15 percent by weight of the composition. The percentages by weight of mineral seal oil and of petroleum distillate in the composition, on the other hand, vary between about 20% and about 40% and between about 0% and about 15%, respectively.

Both the mineral seal oil and the petroleum distillate are employed as solvents. The petroleum distillate is also used to thin the mixture and blend it so as to eliminate lumps. In general, the less petroleum distillate in the polish composition the harder it is. In an alternate embodiment disclosed herein-below, petroleum distillate is eliminated altogether from the polish composition, making it well-suited, because of its hardness, for use in buffing sticks, buffing pads and the like.

In the composition, the high and low melting point stearic acids are present in concentrations related to each other by a ratio of about 1:1. Such a combination of high and low melting point stearic acids provides melting point protection for the polish composition, an important factor in determining the performance of the composition especially when it is used on hard surfaces which must sustain elevated temperatures. Preferably, the high and low melting point stearic acids are those available commercially from Humko Chemical Division, Witco Corporation, Memphis, Tenn., under the trade names HYSTRENE 9718 ® and HYSTRENE 5016 ®, respectively.

Importantly, because each composition according to the present invention has about a 1:1 ratio between its concentrations of high and low melting point stearic acids, the components of the composition stay in solution rather than separating, when the composition melts. Otherwise similar formulations, but lacking this critical 1:1 ratio, tend to be unstable. Upon melting, the silica in them tends to sink to the bottom of their containers. Moreover, the inclusion of high and low melting point stearic acids present in a 1:1 ratio by weight has eliminated the need for aqua ammonia in the composition. Prior art formulations, such as those disclosed in U.S. Pat. No. 4,064,061, require the presence of a significant percentage of aqua ammonia in order to prevent components in the formulation from separating upon melting.

In addition to the major components of the cleaning and polishing composition, namely, silica, mineral seal oil, petroleum distillate and high and low melting point stearic acids, a number of minor components may also be present in the composition. Included among these minor components are preservatives. Suitable preservatives include diazolidinyl urea designated as GERMALL II ®, methylparaben (methyl p-hydroxybenzoate), and propylparaben (propyl p-hydroxybenzoate), which may be present in concentrations ranging, respectively, from 0 percent to about 0.3 percent, from 0 percent to about 0.2 percent, and from 0 percent to about 0.1 percent by weight of the composition GERMALL II ® is commercially available from Sutton Laboratories. In addition to commercially available from Sutton Laboratories. In addition to its use as a preservative, GERMALL II ® is employed to prevent discoloration of the polish mixture and to give it a pastel color. Alternately, phenoxyethanol methyldibromo glutyaronitrile designated as EUXYL K-400 ® can be used as a preservative instead of GERMALL II ®. EUXYL K-400 ® is commercially available from Calgon.

Among the minor components of the cleaning and polishing composition which, as an option, may be added to it are pigments or, alternately, colored food dyes. Employed in concentrations ranging from 0.1 to 8.0 percent by weight of the composition, brown pigments render it suitable for use as a wood polish.

In general appearance, the polish composition according to the present invention is a semi-solid paste. Prior to use, a small amount of the paste is placed on a first clean, soft cloth or the like and the surface to be polished is then coated with the paste. The surface is gently rubbed with a second clean soft cloth. Using this technique, one can quickly polish a smooth, hard surface, whether it is metal, plastic, fiberglass or coated with paint, to a brilliant shine.

EXAMPLES

EXAMPLE 1

A cleaning and polishing composition suitable for impregnation of a cleaning cloth, buffing pad or the like was made up from the following ingredients:

| Component | Percent by Weight |
|---|---|
| Ingredient A | 47.97 |
| Ingredient B | 29.39 |
| Ingredient C | 7.90 |
| Ingredient D | 7.07 |
| Ingredient E | 7.07 |
| Ingredient F | 0.30 |
| Ingredient G | 0.20 |
| Ingredient H | 0.10 |
|  | 100.00 |

Ingredient A is silica flour having a mesh size of 400. It is identified by CAS Number 1317-95-9.

Ingredient B is mineral seal oil, a solvent. Ingredient B is commercially available from Cone Solvents. CAS Number 64741-44-2.

Ingredient C is a petroleum distillate designated as SHELL SOL 71 ®. SHELL SOL 71 ® is commercially available from Shell Chemical Company and is a product that meets the requirements of ASTM D-235 Standard Specification for mineral spirits; Federal Specification TT-T-2911 Odorless Mineral Spirits, Type III; FDA 21 CFR 172.882 and 178.3530 Synthetic Isoparaffinic Petroleum Hydrocarbons. CAS Number 64241-65-7.

Ingredients D and E are high and low melting point stearic acid designated as HYSTRENE 9718 ® and HYSTRENE 5016 ®, respectively. "HYSTRENE 9718 ®" is 92% stearic acid and has a titer of 66.5-68.5 degrees C.; its typical composition has the following percentages of saturated C 16 and C 18 carbon chains: 5 and 95, respectively. HYSTRENE 5016 ® is triple pressed grade stearic acid and has a titer of 54.5-56.6 degrees C.; its typical composition has the following percentages of saturated C 14, C 15, C 16, C 17, and C 18 carbon chains: 1, 0.5, 52, 2.5, and 44, respectively. Ingredients D and E are both identified by CAS Number 57-11-4 and commercially available from Humko Chemical Division, Witco Corporation, Memphis, Tenn.

Ingredient F is diazolidinyl urea. This ingredient is primarily used as a preservative. Ingredient F is commercially available from Sutton Laboratories under the trade name GERMALL II ® (CAS Number 78491-02-8). Alternately, instead of GERMALL II ®, phenoxyethanol methyldibromo glutyaronitrile commercially available from Calgon under the trade name EUXYL K-400 ® can be used.

Ingredients G and H are methylparaben and propylparaben, respectively.

EXAMPLE 2

In an alternate embodiment, a cleaning and polishing composition was made up by mixing together the following:

| Component | Percent by Weight |
|---|---|
| Ingredient A | 50.0 |
| Ingredient B | 30.0 |
| Ingredient D | 10.0 |
| Ingredient E | 10.0 |
|  | 100.0 |

In Examples 1 and 2 hereinabove, ingredients A, B, D, and E are identical components. In preparing the cleaning and polishing compositions disclosed in these examples, ingredients D and E, the high and low melting point stearic acids, are first heated to about 60 degrees C., until they melt and turn clear. Then the remaining ingredients are stirred into the liquefied stearic acids and blended with them until the mixture is lump free.

Cleanup of surfaces of equipment which actually contact any of the compositions described in Examples 1 and 2 during its preparation can be accomplished easily with soap and water.

It is understood by those skilled in the art that they may conceive other applications, modifications and/or changes in the invention described hereinabove. Any such applications, modifications or changes which fall within the purview of the description are intended to be illustrative and not intended to be limitative. The scope of the invention is limited only by the scope of the claims appended hereto.

I claim:

1. A cleaning and polishing composition which consists essentially of:
   a. about 30 percent to about 60 percent by weight of silica;
   b. about 20 percent to about 40 percent by weight of mineral seal oil;
   c. about 5 percent to about 15 percent by weight of high melting point stearic acid;
   d. about 5 percent to about 15 percent by weight of low melting point stearic acid, the percentages by weight of the high and low melting point stearic acids being related to each other in a ratio of about 1:1;

e. 0 percent to about 15 percent by weight of petroleum distillate;
f. 0 percent to about 0.3 percent by weight of a first preservative;
g. 0 percent to about 0.2 percent by weight of a second preservative;
h. 0 percent to about 0.1 percent by weight of a third preservative; and
i. 0 percent to about 8 percent by weight of a dye.

2. A cleaning and polishing composition comprising:
a. from 30 percent to 60 percent by weight of an abrasive;
b. from 20 percent to 40 percent by weight of a solvent;
c. from 5 percent to 15 percent by weight of high melting point stearic acid; and
d. from 5 percent to 15 percent by weight of low melting point stearic acid, the percentages by weight of the high and low melting point stearic acids being related to each other in a ratio of about 1:1.

3. A cleaning and polishing composition which comprises the following ingredients which together are 99.70 percent by weight of the composition:

|  | Percent By Weight of Composition |
|---|---|
| Silica | 47.97 |
| Mineral Seal Oil | 29.39 |
| Petroleum Distillate | 7.90 |
| Stearic Acid (High Melting Point) | 7.07 |
| Stearic Acid (Low Melting Point) | 7.07 |
| Methylparaben | 0.20 |
| Propylparaben | 0.10 |
|  | 99.70 |

4. A cleaning and polishing composition comprising:
a. about 30 percent to about 60 percent by weight of an abrasive;
b. about 20 percent to about 40 percent by weight of a solvent;
c. about 5 percent to about 15 percent by weight of stearic acid having a titer in the range of 66.5 to 68.5 degrees C.; and
d. about 5 percent to about 15 percent by weight of stearic acid having a titer in the range of 54.5 to 56.6 degrees C., the percentage by weight of the stearic acid having a titer in the range of 66.5 to 68.5 degrees C. being related, by a ratio of about 1:1, to the percentage by weight of the stearic acid having a titer in the range of 54.5 to 56.6 degrees C.

* * * * *